United States Patent
Guan et al.

(10) Patent No.: US 12,095,299 B2
(45) Date of Patent: Sep. 17, 2024

(54) ELECTRONIC DEVICE AND METHOD FOR CHARGING BATTERY

(71) Applicant: Ningde Amperex Technology Limited, Ningde (CN)

(72) Inventors: Ting Guan, Ningde (CN); Shan Zhu, Ningde (CN); Fei Wu, Ningde (CN)

(73) Assignee: NINGDE AMPEREX TECHNOLOGY LIMITED, Ningde (CN)

( * ) Notice: Subject to any disclaimer, the term of this patent is extended or adjusted under 35 U.S.C. 154(b) by 556 days.

(21) Appl. No.: 17/033,835

(22) Filed: Sep. 27, 2020

(65) Prior Publication Data

US 2021/0119461 A1    Apr. 22, 2021

Related U.S. Application Data

(63) Continuation-in-part of application No. PCT/CN2019/112384, filed on Oct. 21, 2019.

(51) Int. Cl.
*H02J 7/00* (2006.01)

(52) U.S. Cl.
CPC .......... *H02J 7/0048* (2020.01); *H02J 7/0071* (2020.01); *H02J 7/00712* (2020.01); *H02J 7/007182* (2020.01)

(58) Field of Classification Search
CPC .... H02J 7/0048; H02J 7/0071; H02J 7/00712; H02J 7/007182

(Continued)

(56) References Cited

U.S. PATENT DOCUMENTS 5,430,363 A * 7/1995 Kim ................. H02J 7/007194
                                                                 320/152
5,631,533 A * 5/1997 Imaseki ............... H02J 7/0016
                                                                 320/128

(Continued)

FOREIGN PATENT DOCUMENTS

CN          102169002 A       8/2011
CN          103107378 A       5/2013

(Continued)

OTHER PUBLICATIONS

Supplementary European Search Report issued on May 4, 2022, in corresponding European Application No. 19946240, 2 pages.

(Continued)

*Primary Examiner* — John T Trischler
(74) *Attorney, Agent, or Firm* — Maier & Maier, PLLC

(57) ABSTRACT

A method for charging a battery includes charging the battery with a charging current at a constant current during an mth charge and discharge cycle; a first state of charge $SOC_1$ of the battery when the constant current charging phase in any one charge and discharge cycle ends is the same as a standard state of charge $SOC_0$, $SOC_b \leq SOC_0 \leq SOC_a + k$. $SOC_a$ is a state of charge or a preset value of the battery at the end of the constant current charging phase during an nth charge and discharge cycle, $SOC_b$ is a state of charge or a preset value of the battery at the end of the constant current charging phase during an (m-1)th charge and discharge cycle, $SOC_b \leq SOC_0 \leq SOC_a + k$, $0 \leq k \leq 10\%$, and $SOC_a + k \leq 100\%$.

20 Claims, 4 Drawing Sheets

(58) Field of Classification Search
USPC .................................................. 320/132
See application file for complete search history.

(56) References Cited

U.S. PATENT DOCUMENTS

| | | | | |
|---|---|---|---|---|
| 5,642,031 | A * | 6/1997 | Brotto | H02J 7/007184 |
| | | | | 320/156 |
| 5,703,466 | A * | 12/1997 | Honda | H02J 7/00712 |
| | | | | 320/152 |
| 5,994,875 | A * | 11/1999 | Lee | H02J 7/00712 |
| | | | | 320/132 |
| 6,188,202 | B1 * | 2/2001 | Yagi | H02J 7/007184 |
| | | | | 320/125 |
| 6,771,046 | B2 * | 8/2004 | Ariga | H02J 7/0071 |
| | | | | 320/160 |
| 7,688,075 | B2 * | 3/2010 | Kelley | G01R 31/392 |
| | | | | 324/426 |
| 7,830,126 | B2 * | 11/2010 | Kawahara | H02J 7/0031 |
| | | | | 320/160 |
| 7,986,128 | B2 * | 7/2011 | Kubota | H02J 7/00036 |
| | | | | 320/124 |
| 8,179,139 | B2 * | 5/2012 | Kawasumi | H01M 50/574 |
| | | | | 324/426 |
| 8,207,740 | B2 * | 6/2012 | Lin | H01M 10/441 |
| | | | | 320/119 |
| 9,356,461 | B2 * | 5/2016 | Howard | H02J 7/007194 |
| 9,525,300 | B2 * | 12/2016 | Aridome | B60L 58/22 |
| 9,579,990 | B2 * | 2/2017 | Butler | H02J 7/005 |
| 9,588,184 | B2 * | 3/2017 | Underhill | B60L 58/13 |
| 9,634,497 | B2 | 4/2017 | Baek et al. | |
| 9,711,976 | B2 * | 7/2017 | Abe | H01M 10/486 |
| 9,728,995 | B2 * | 8/2017 | Matsumura | H02J 7/0029 |
| 9,793,736 | B2 * | 10/2017 | Luo | H02J 7/00711 |
| 9,847,663 | B2 * | 12/2017 | Nishikawa | H02J 7/007188 |
| 9,902,277 | B2 * | 2/2018 | Keller | H02J 7/0014 |
| 9,960,611 | B2 * | 5/2018 | Toya | H02J 7/0048 |
| 9,975,447 | B2 * | 5/2018 | Tokushige | H01M 10/625 |
| 10,044,214 | B2 | 8/2018 | Barsukov | |
| 10,093,191 | B2 * | 10/2018 | Keller | B60L 53/14 |
| 10,135,279 | B2 * | 11/2018 | Luo | H02J 7/00 |
| 10,283,993 | B2 * | 5/2019 | Deng | H02J 7/0071 |
| 10,389,155 | B2 * | 8/2019 | Deng | H02J 7/0071 |
| 10,439,417 | B2 * | 10/2019 | Murata | B60L 58/15 |
| 10,498,156 | B2 * | 12/2019 | Zhang | H02J 7/0071 |
| 10,557,893 | B2 * | 2/2020 | Fukushima | G01R 31/392 |
| 10,707,689 | B2 * | 7/2020 | Barsukov | H02J 7/007184 |
| 10,763,684 | B2 * | 9/2020 | Horiuchi | H02J 7/02 |
| 10,809,049 | B2 * | 10/2020 | Ghantous | H01M 10/425 |
| 10,985,590 | B2 * | 4/2021 | Lim | H01M 10/46 |
| 11,072,256 | B2 * | 7/2021 | Butler | B60L 53/60 |
| 11,079,212 | B2 * | 8/2021 | Ghantous | H01M 10/44 |
| 11,081,899 | B2 * | 8/2021 | Ono | H02J 7/0013 |
| 11,165,270 | B2 * | 11/2021 | Owen | H02J 7/0071 |
| 11,181,585 | B2 * | 11/2021 | Yao | G01R 31/3842 |
| 11,201,359 | B2 * | 12/2021 | Tian | H01M 10/425 |
| 11,201,490 | B2 * | 12/2021 | Tian | H02J 7/0048 |
| 11,258,289 | B2 * | 2/2022 | Tian | H02J 7/007 |
| 11,277,012 | B2 * | 3/2022 | Ono | H02J 7/0019 |
| 11,381,094 | B2 * | 7/2022 | Park | H02J 7/0029 |
| 11,381,102 | B2 * | 7/2022 | Tian | H02J 7/0071 |
| 11,437,838 | B2 * | 9/2022 | Du | H02J 7/0048 |
| 11,469,601 | B2 * | 10/2022 | Ono | H02J 7/0016 |
| 11,527,903 | B2 * | 12/2022 | Chen | H02J 50/10 |
| 11,539,222 | B2 * | 12/2022 | Ono | H02J 7/0016 |
| 2002/0145405 | A1 * | 10/2002 | Murakami | H02J 7/0069 |
| | | | | 320/130 |
| 2003/0169017 | A1 * | 9/2003 | Ariga | H02J 7/0071 |
| | | | | 320/125 |
| 2004/0130294 | A1 * | 7/2004 | Ng | H02J 7/0071 |
| | | | | 320/128 |
| 2006/0033472 | A1 * | 2/2006 | Wang | H02J 7/06 |
| | | | | 320/128 |
| 2006/0238203 | A1 * | 10/2006 | Kelley | G01R 31/389 |
| | | | | 324/433 |
| 2007/0247106 | A1 * | 10/2007 | Kawahara | B60L 58/22 |
| | | | | 320/104 |
| 2008/0233469 | A1 * | 9/2008 | Drozdz | H02J 7/00712 |
| | | | | 429/61 |
| 2010/0194398 | A1 * | 8/2010 | Kawasumi | H01M 50/574 |
| | | | | 324/430 |
| 2010/0321025 | A1 * | 12/2010 | Lin | H01M 10/4207 |
| | | | | 324/427 |
| 2011/0109273 | A1 * | 5/2011 | Tamezane | B60L 58/15 |
| | | | | 320/132 |
| 2011/0181249 | A1 * | 7/2011 | Deguchi | H01M 10/0525 |
| | | | | 320/149 |
| 2011/0316548 | A1 * | 12/2011 | Ghantous | H01M 50/569 |
| | | | | 324/427 |
| 2012/0200257 | A1 * | 8/2012 | Schwarz | H01M 10/486 |
| | | | | 320/109 |
| 2012/0249152 | A1 * | 10/2012 | Nishibayashi | H02J 13/00016 |
| | | | | 324/430 |
| 2014/0131633 | A1 * | 5/2014 | Ito | H01M 4/364 |
| | | | | 252/519.15 |
| 2014/0151079 | A1 * | 6/2014 | Furui | B25F 5/00 |
| | | | | 173/171 |
| 2014/0152247 | A1 * | 6/2014 | Kim | H02J 50/12 |
| | | | | 320/108 |
| 2014/0239900 | A1 * | 8/2014 | Abe | H01M 10/482 |
| | | | | 320/118 |
| 2014/0253039 | A1 * | 9/2014 | Barsukov | H02J 7/007184 |
| | | | | 320/112 |
| 2014/0320089 | A1 * | 10/2014 | Wang | H01M 10/448 |
| | | | | 320/157 |
| 2014/0324370 | A1 * | 10/2014 | Underhill | H01M 16/006 |
| | | | | 702/63 |
| 2015/0115969 | A1 * | 4/2015 | Ishida | G01R 31/392 |
| | | | | 324/426 |
| 2015/0236525 | A1 * | 8/2015 | Aridome | H02J 7/04 |
| | | | | 320/107 |
| 2015/0340885 | A1 * | 11/2015 | Baek | H02J 7/0013 |
| | | | | 320/160 |
| 2016/0028255 | A1 * | 1/2016 | Nishikawa | H02J 7/00 |
| | | | | 320/162 |
| 2016/0046199 | A1 * | 2/2016 | Butler | H02J 7/005 |
| | | | | 320/106 |
| 2016/0089994 | A1 * | 3/2016 | Keller | H02J 7/0014 |
| | | | | 320/153 |
| 2016/0099593 | A1 * | 4/2016 | Lim | H02J 7/0048 |
| | | | | 320/114 |
| 2016/0111898 | A1 * | 4/2016 | Luo | H02J 7/0048 |
| | | | | 320/162 |
| 2016/0116548 | A1 * | 4/2016 | Ghantous | H01M 10/425 |
| | | | | 702/63 |
| 2016/0126760 | A1 * | 5/2016 | Murata | B60L 1/02 |
| | | | | 320/107 |
| 2016/0266209 | A1 * | 9/2016 | Imaizumi | G01R 31/3842 |
| 2016/0301226 | A1 * | 10/2016 | Matsumura | H02J 7/007182 |
| 2016/0327613 | A1 * | 11/2016 | Tenmyo | G01R 31/367 |
| 2017/0066342 | A1 * | 3/2017 | Butler | B60L 53/68 |
| 2017/0117721 | A1 * | 4/2017 | Toya | H02J 7/0013 |
| 2017/0149100 | A1 * | 5/2017 | Ishii | H01M 4/661 |
| 2017/0366015 | A1 * | 12/2017 | Luo | H02J 7/00 |
| 2017/0371000 | A1 * | 12/2017 | Fukushima | H02J 7/0013 |
| 2018/0123354 | A1 * | 5/2018 | Lim | H01M 10/46 |
| 2018/0134168 | A1 * | 5/2018 | Keller | H02J 7/007182 |
| 2018/0149462 | A1 * | 5/2018 | Ghantous | H01M 10/425 |
| 2018/0152039 | A1 * | 5/2018 | Horiuchi | H02J 7/00718 |
| 2019/0013689 | A1 * | 1/2019 | Barsukov | H02J 7/007184 |
| 2019/0020209 | A1 * | 1/2019 | Komiyama | H02J 7/0013 |
| 2020/0028375 | A1 * | 1/2020 | Ono | H01M 10/441 |
| 2020/0195029 | A1 * | 6/2020 | Fujita | H02J 7/0071 |
| 2020/0244075 | A1 * | 7/2020 | Park | H02J 7/0048 |
| 2020/0303938 | A1 * | 9/2020 | Owen | H01M 10/44 |
| 2020/0321788 | A1 * | 10/2020 | Ono | H02J 7/0019 |
| 2020/0321789 | A1 * | 10/2020 | Ono | H02J 7/0019 |
| 2021/0075230 | A1 * | 3/2021 | Ono | H02J 7/007182 |
| 2021/0099003 | A1 * | 4/2021 | Zhu | H01M 10/0525 |
| 2021/0119466 | A1 * | 4/2021 | Guan | H02J 7/007192 |
| 2021/0210971 | A1 * | 7/2021 | Lim | H02J 7/02 |
| 2021/0296919 | A1 * | 9/2021 | Liu | H01M 10/46 |

(56) References Cited

U.S. PATENT DOCUMENTS

| | | | | |
|---|---|---|---|---|
| 2021/0351446 A1* | 11/2021 | Zhu | ............ | H02J 7/0068 |
| 2021/0354582 A1* | 11/2021 | Butler | ............ | G06Q 50/00 |
| 2021/0370796 A1* | 12/2021 | Seo | ............ | G01R 31/36 |
| 2021/0391742 A1* | 12/2021 | Guan | ............ | H01M 10/44 |
| 2022/0077694 A1* | 3/2022 | Ono | ............ | H02J 7/007182 |
| 2022/0109195 A1* | 4/2022 | Morimoto | ............ | H02J 7/00714 |
| 2022/0173606 A1* | 6/2022 | Mihara | ............ | H01M 10/44 |
| 2022/0200067 A1* | 6/2022 | Sugihara | ............ | H02J 7/0048 |

FOREIGN PATENT DOCUMENTS

| | | | |
|---|---|---|---|
| CN | 103730702 | A | 4/2014 |
| CN | 104391251 | A | 3/2015 |
| CN | 105098876 | A | 11/2015 |
| CN | 105205298 | A | 12/2015 |
| CN | 103107378 | B | 8/2016 |
| CN | 106207291 | A | 12/2016 |
| CN | 107528361 | A | 12/2017 |
| CN | 109017336 | A | 12/2018 |
| EP | 3288150 | A1 | 2/2018 |
| JP | 2003256079 | A | 9/2003 |

OTHER PUBLICATIONS

Office Action issued on Dec. 18, 2023, in corresponding Japanese Application No. 201980020624.0, 12 pages.

\* cited by examiner

ELECTRONIC DEVICE AND METHOD FOR CHARGING BATTERY

CROSS-REFERENCE TO RELATED APPLICATIONS

This application is the national phase entry of International Application No. PCT/CN2019/112384 filed on Oct. 21, 2019, the contents of which are incorporated by reference herein.

TECHNICAL FIELD

The subject matter herein generally relates to batteries, especially relates to a method for charging a battery, an electronic device and a storage medium.

BACKGROUND

In the prior art, the method of charging a lithium-ion battery includes continuously charging the battery to a certain voltage (e.g. the charging limit voltage) with a preset constant current, and the certain voltage is then used to charge the battery to a full charge state. In this case, with the increasing number of the battery charging cycles and the using time, the battery will age and the battery's impedance will increase. The increasing of the battery's impedance will lead to increased charging polarization, which will make a charging time in constant current charging phase shorter and extend a charging time in constant voltage charging phase. Thus, the total charging time of the battery becomes much longer.

SUMMARY

What is needed is a method for charging a battery, an electronic device, and a non-transitory storage medium.

A method for charging a battery includes: charging the battery with a charging current at a constant current during an mth charge and discharge cycle; wherein m is any two or more integers of 1, 2, 3, ..., x; wherein a first state of charge $SOC_1$ of the battery when an ending of the constant current charging phase in any one charge and discharge cycle is the same as a standard state of charge $SOC_0$, $SOC_b \leq SOC_0 \leq SOC_a + k$; $SOC_a$ is a state of charge or a preset value of the battery at the end of the constant current charging phase during an nth charge and discharge cycle, $SOC_b$ is a state of charge or a preset value of the battery at the end of the constant current charging phase during an (m−1)th charge and discharge cycle, n is an integer greater than or equal to 0, and m is an integer greater than n+1, $SOC_b \leq SOC_0 \leq SOC_a + k$, $0 \leq k \leq 10\%$, and $SOC_a + k \leq 100\%$.

The electronic device includes: a battery, and at least one processor configured to: charge the battery with a charging current at a constant current during an mth charge and discharge cycle; wherein m is any two or more integers of 1, 2, 3, ..., x; wherein a first state of charge $SOC_1$ of the battery when an ending of the constant current charging phase in any one charge and discharge cycle is the same as a standard state of charge $SOC_0$, $SOC_b \leq SOC_0 \leq SOC_a + k$; $SOC_a$ is a state of charge or a preset value of the battery at the end of the constant current charging phase during an nth charge and discharge cycle, $SOC_b$ is a state of charge or a preset value of the battery at the end of the constant current charging phase during an (m−1)th charge and discharge cycle, n is an integer greater than or equal to 0, and m is an integer greater than n+1, $SOC_b \leq SOC_0 \leq SOC_a + k$, $0 \leq k \leq 10\%$, and $SOC_a + k \leq 100\%$.

A non-transitory storage medium having stored thereon instructions that, when executed by a processor of an electronic device, cause the processor to perform a method for charging a battery, the electronic device including the battery. The method includes: charging the battery with a charging current at a constant current during an mth charge and discharge cycle; wherein m is any two or more integers of 1, 2, 3, ..., x; wherein a first state of charge $SOC_1$ of the battery when an ending of the constant current charging phase in any one charge and discharge cycle is the same as a standard state of charge $SOC_0$, $SOC_b \leq SOC_0 \leq SOC_a + k$; $SOC_a$ is a state of charge or a preset value of the battery at the end of the constant current charging phase during an nth charge and discharge cycle, $SOC_b$ is a state of charge or a preset value of the battery at the end of the constant current charging phase during an (m−1)th charge and discharge cycle, n is an integer greater than or equal to 0, and m is an integer greater than n+1, $SOC_b \leq SOC_0 \leq SOC_a + k$, $0 \leq k \leq 10\%$, and $SOC_a + k \leq 100\%$.

Compared with prior art, the foregoing method, electronic device, and storage medium, can use the standard state of charge to cut off the constant-current charging stage of the battery after the mth charge and discharge cycle. The method can extend the charging time in the constant current charging phase of the battery, and then reduce the full-charge time of the battery, and also make sure the battery do not occur an overcharge phenomenon. This technical solution not only charges the battery faster, but also increases the cycle life of the battery.

DETAILED DESCRIPTION

Embodiments of the present disclosure are described. Various details are described in the following descriptions for better understanding of the present disclosure. However, the present disclosure may also be implemented in ways other than those described herein. The scope of the present disclosure is not to be limited by the specific embodiments disclosed below.

The present disclosure, referencing the accompanying drawings, is illustrated by way of examples and not by way of limitation. It should be noted that references to "an" or "one" embodiment in this disclosure are not necessarily to the same embodiment, and such references mean "at least one."

Figure 1:
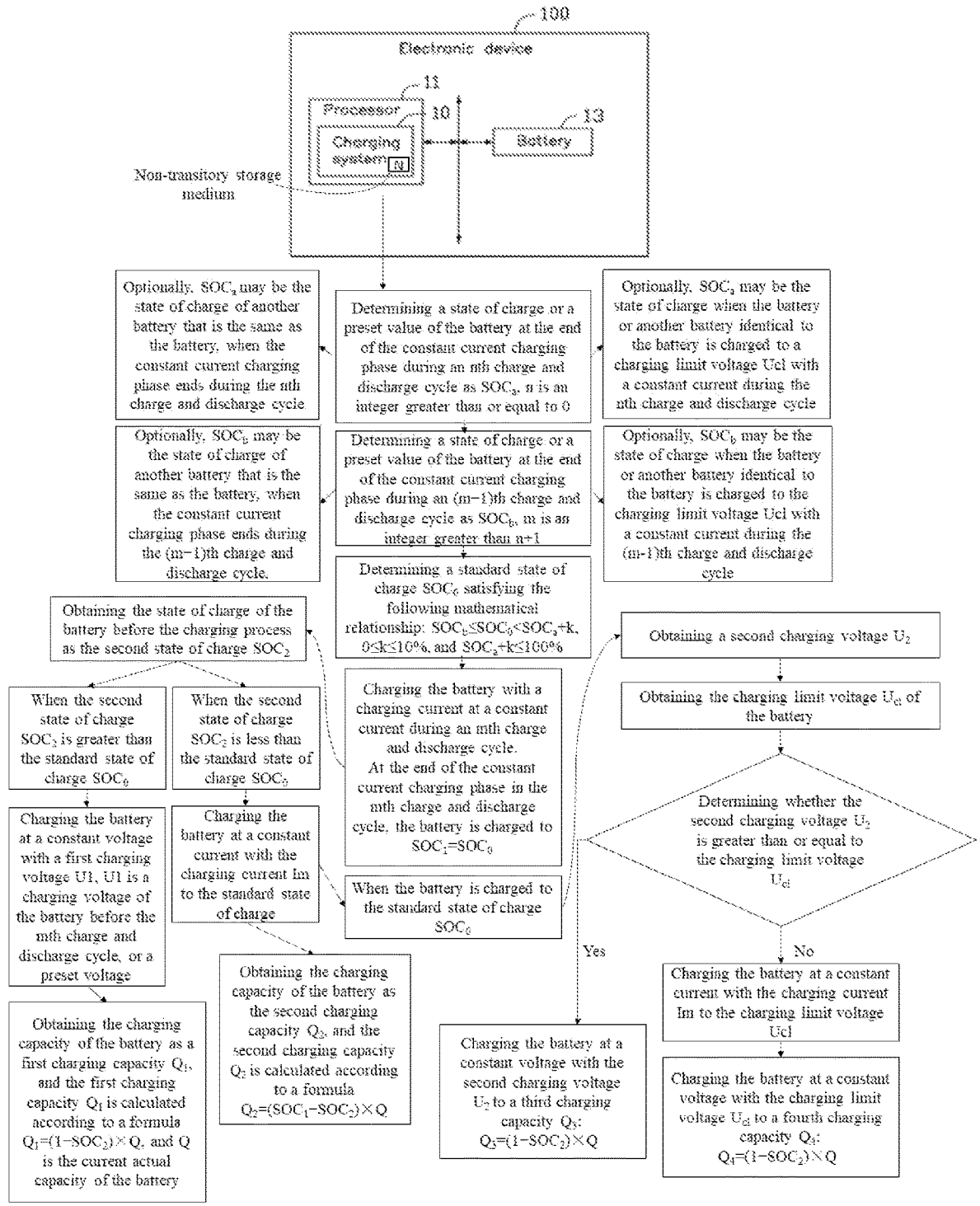
FIG. 1 is a block diagram of an embodiment of an electronic device.

Referring to FIG. 1, a charging system 10, which includes a non-transitory storage medium N, is applied to an electronic device 100. The electronic device 100 includes at least one processor 11, and a battery 13. The at least one processor 11, and the battery 13 are connected with each other through a bus, or are directly connected with each other. The process is configured to perform a method for charging a battery, comprising:

determining a state of charge or a preset value of the battery at the end of the constant current charging phase during an nth charge and discharge cycle as $SOC_a$, n is an integer greater than or equal to 0;

determining a state of charge or a preset value of the battery at the end of the constant current charging phase during an (m−1)th charge and discharge cycle as $SOC_b$, m is an integer greater than n+1;

based on the $SOC_a$ and $SOC_b$, determining a standard state of charge $SOC_0$ satisfying the following mathematical relationship:

$$SOC_b \leq SOC_0 \leq SOC_a + k, \ 0 \leq k \leq 10\%, \text{ and } SOC_a + k \leq 100\%;$$

charging the battery with a charging current at a constant current during an mth charge and discharge cycle. When the constant current charging phase ends, the first state of charge $SOC_1$ of the battery is the same as $SOC_0$.

FIG. 1 illustrates only one example of the electronic device 100, other examples may include more or fewer components than those shown in the embodiment, or have a different configuration of the various components. The electronic device 100 may be, but is not limited to, an electric motorcycle, an electric bicycle, an electric car, a mobile phone, a tablet computer, a personal digital assistant (PDA), a personal computer, or any other suitable rechargeable device.

In at least one embodiment, the battery 13 is rechargeable battery used to provide electrical energy to the electronic device 100. For example, the battery 13 may be a lead-acid battery, a nickel-cadmium battery, a nickel-hydrogen battery, a lithium-ion battery, a lithium-polymer battery and a lithium iron phosphate battery, and so on. In one embodiment, the battery 13 has a logical connection to the processor 11 by the charging system 10, to realize functions of charging, discharge, and power management through the charging system 10. In one embodiment, the battery 13 includes an electric cell (not shown).

Figure 2:
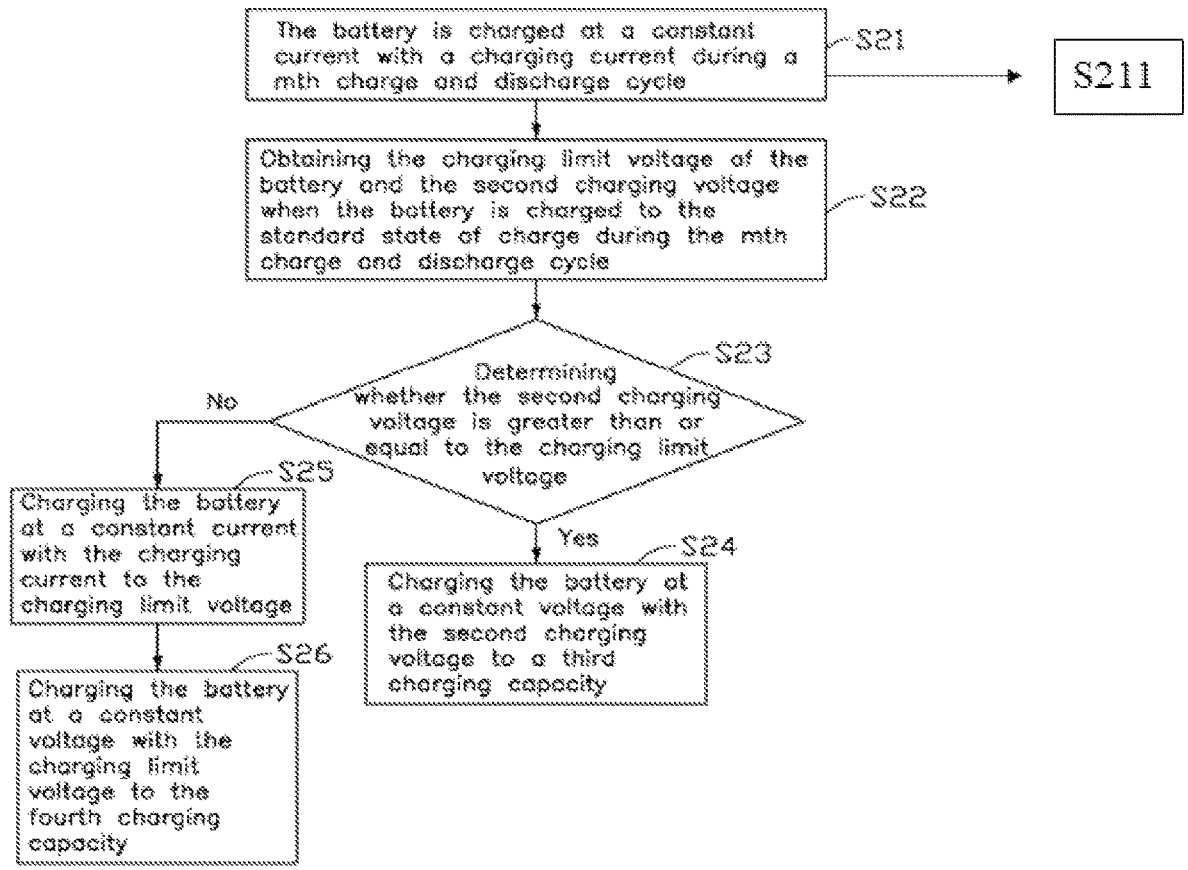
FIG. 2 is a flowchart of an embodiment of a method for charging a battery.

FIG. 2 illustrates a flowchart of a method for charging a battery. The method for charging the battery may include the following steps.

In block S21, the battery is charged at a constant current with a charging current during an mth charge and discharge cycle.

In at least one embodiment, m is any two or more integers of 1, 2, 3, . . . , x, and a first state of charge ($SOC_1$) of the battery 13 when the ending of the constant current charging phase in any one charge and discharge cycle is the same as a standard state of charge.

During the mth charge-discharge cycle, the charging system 10 performs constant current charging the battery 13 with a charging current $I_m$.

The state of charge (SOC) refers to the ratio of the remaining capacity of the battery to the full charge capacity of the battery.

In at least one embodiment, m is any two or more integers of 1, 2, 3, . . . , x, which means that the first state of charge of the battery at the end of the constant current charging phase is the same as a standard state of charge during at least two charge and discharge cycles.

In the embodiment, the first state of charge is recorded as $SOC_1$, and the standard state of charge is recorded as $SOC_0$.

The standard state of charge $SOC_0$ may change with the number of cycles, that is, the first state of charge $SOC_1$ in each charge and discharge cycle may correspond to a different $SOC_0$.

The standard state of charge $SOC_0$ may be a parameter obtained through actual testing or a parameter obtained directly from a battery after charging and discharging, or a preset value may be used.

In one embodiment, $SOC_b \leq SOC_0 \leq SOC_a + k$, $0 \leq k \leq 10\%$, and $SOC_a + k \leq 100\%$.

In the embodiment, the $SOC_a$ is a state of charge or a preset value of the battery 13 at the end of the constant current charging phase during the nth charge and discharge cycle, and n is an integer greater than or equal to 0.

The $SOC_b$ is a state of charge or a preset value of the battery 13 at the end of the constant current charging phase during the (m−1)th charge and discharge cycle, and m is an integer greater than n+1.

In at least one embodiment, the $SOC_a$ and the $SOC_b$ are obtained in the following ways:

The $SOC_a$ is the state of charge of another battery (such as a battery of a same model) that is the same as the battery 13 when the constant current charging phase finishes during the nth charge and discharge cycle. In one embodiment, the $SOC_b$ is the state of charge of another battery (such as a battery of the same model) that is the same as the battery 13 when the constant current charging phase finishes during the (m−1)th charge and discharge cycle.

In another embodiment, the $SOC_a$ and the $SOC_b$ are obtained in the following ways:

The $SOC_a$ is the state of charge when the battery 13 or another battery identical to the battery 13 is charged to a charging limit voltage $U_{c1}$ with a constant current during the nth charge and discharge cycle. The $SOC_b$ is the state of charge when the battery 13, or another battery identical to the battery 13, is charged to $U_{c1}$ with a constant current during the (m−1)th charge and discharge cycle.

The $U_{c1}$ is a charging limit voltage of the battery 13 or the other battery (such as the charging limit voltage known in the background art or the charging limit voltage written on the battery product specification).

Figure 3:
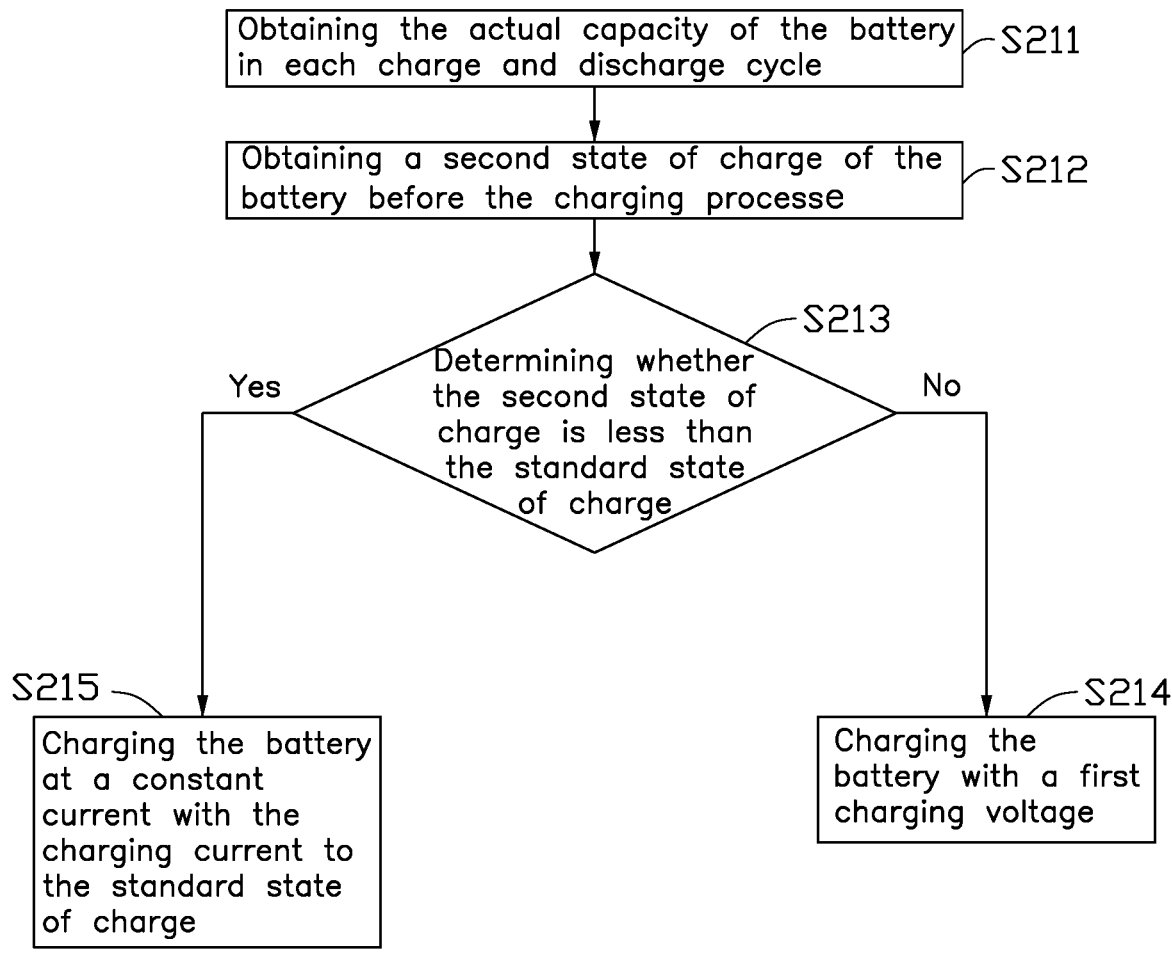
FIG. 3 is a flowchart of another embodiment of a method for charging a battery.

The charging system 10 uses the charging current $I_m$ to charge the battery with the constant current. In another embodiment, referring to FIG. 3, the charging process of the block S21 may include the following specific steps:

In block S211, obtaining the actual capacity of the battery 13 in each charge and discharge cycle.

In the embodiment, the charging system 10 obtains current capacity and discharge capacity of the battery 13 in all of the charge-discharge cycles. In one embodiment, the current capacity of the battery 13 in each charge-discharge cycle is the actual capacity of the battery 13 corresponding to the each charge-discharge cycle. Namely, the current capacity of the battery 13 in each charge-discharge cycle is equal to a maximum capacity when the battery 13 is discharged from a full charge state to a fully-discharged state in corresponding the each charge-discharge cycle. In one embodiment, the discharge capacity of the battery 13 is measured by volt-ammeter. In one embodiment, the fully-discharged state is a state when the capacity of the battery 13 is zero after the battery 13 is discharged. In another embodiment, the fully-discharged state is a state when the capacity of the battery 13 reaches a preset capacity or preset voltage after the battery 13 is discharged.

In one embodiment, the charging system 10 obtains current capacity of the battery 13 in all of the charge-discharge cycles, and records a temperature of the battery 13 and a charging rate or discharging rate of the battery 13. The charging system 10 performs a conversion calculation of the battery's capacity according to a correspondence between different capacities of the battery 13 in different temperatures and different rates, and obtains a maximum capacity of the battery 13 corresponding to charging temperature of the capacity 13 and charging rate of the battery 13. The maximum capacity of the battery 13 is the current capacity of the battery 13 described above.

In detail, the current capacity of the battery 13 varies with usage of the battery 13 or the counted number of charge-discharge cycles. The capacity of the battery is directly related to ageing of an electrode assembly of the battery 13.

In block S212, obtaining a second state of charge $SOC_2$ of the battery before the charging process.

In at least one embodiment, the charging system 10 obtains the state of charge and the temperature of the battery 13 before the charging process during the mth charge and discharge cycle. The state of charge of the battery 13 before charging is defined as the second state of charge $SOC_2$.

In block S213, determining whether the second state of charge $SOC_2$ is less than the standard state of charge $SOC_0$. If the second state of charge $SOC_2$ is less than the standard state of charge $SOC_0$, block 215 is implemented, otherwise block 214 is implemented.

During the charging process of the battery 13, the charging system 10 will compare the standard state of charge $SOC_0$ and the second state of charge $SOC_2$ at the same temperature. For example, the charging system 10 obtains the second state of charge $SOC_2$ of the battery 13 when the discharging process is cut off in the mth charge and discharge cycle, and the environment temperature of the battery 13 before the charging process, and compares the second state of charge $SOC_2$ with the standard state of charge $SOC_0$ corresponding to the environment temperature.

In block S214, charging the battery with a first charging voltage $U_1$.

The first charging voltage $U_1$ is a charging voltage of the battery 13 during a constant-voltage charging stage before the mth charge and discharge cycle, or the $U_1$ is a preset voltage. That is, during the mth charge and discharge cycle, the charging voltage of the battery 13 during the constant-voltage charge phase in any one of charge and discharge cycles before the mth charge and discharge cycle is used to charge the battery at a constant voltage.

In at least one embodiment, the charging system 10 obtains the first charging voltage of the battery 13 at a constant voltage charging stage before the mth charge and discharge cycle at the same temperature. During the mth charge and discharge cycle, the charging system 10 performs constant voltage charging of the battery 13 according to the first charging voltage and a total charging capacity. The total charging capacity of the battery 13 is a first charging capacity.

In detail, the first charging capacity is $Q_1$, and the first charging capacity $Q_1$ is calculated according to formula $Q_1=(1-SOC_2)\times Q$.

The $SOC_2$ is the second state of charge, and the Q is the current actual capacity of the battery 13, and in the present application, Q described below refers to the current actual capacity of the battery 13.

When the second state of charge $SOC_2$ is greater than or equal to the standard state of charge $SOC_0$, the charging system 10 uses the first charging voltage $U_1$ to charge the battery 13 at a constant voltage, and the charging capacity at this stage is the first charging capacity $Q_1$ to ensure that the battery 13 is not being overcharged.

In block S215, charging the battery at a constant current with the charging current $I_m$ to the standard state of charge $SOC_0$.

In at least one embodiment, the charging system 10 uses the charging current $I_m$ to charge the battery 13 at a constant current to the standard state of charge $SOC_0$.

The charging system 10 uses the charging current $I_m$ to charge the battery 13 at a constant current. The charging capacity of the battery 13 in block S215 is a second charging capacity.

In detail, the second charging capacity is $Q_2$, and the second charging capacity $Q_2$ is calculated according to formula $Q_2=(SOC_1-SOC_2)\times Q$.

When the second state of charge $SOC_2$ is less than the standard state of charge $SOC_0$, the charging system 10 will charge the battery 13 with the charging current $I_m$ to the standard state of charge $SOC_0$ at a constant current. The charging capacity at this stage is the second charging capacity $Q_2$.

The impedance of the battery may decrease and then increase as the number of cycles increases, thus the second charging voltage $U_2$ may be less than the charging limit voltage $U_{c1}$ when the battery is charged to the standard state of charge $SOC_0$ during the mth charge and discharge cycle. At this time, in order to further shorten the full charge time of the battery, the second charging voltage $U_2$ and the charging limit voltage $U_{c1}$ must be compared to determine the subsequent charging method for example, blocks S22 to S26 are described below.

In block S22, obtaining the charging limit voltage $U_{c1}$ of the battery 13 and the second charging voltage $U_2$ when the battery 13 is charged to the standard state of charge $SOC_0$ during the mth charge and discharge cycle.

In the embodiment, the charging system 10 obtains the charging limit voltage $U_{c1}$ of the battery 13 and the second charging voltage $U_2$ (such as block S215) when the battery 13 is charged to the standard state of charge $SOC_0$ during the mth charge and discharge cycle. The charging limit voltage $U_{c1}$ may be understood as the charging limit voltage known in the background art.

In block S23, determining whether the second charging voltage $U_2$ is greater than or equal to the charging limit voltage $U_{c1}$. If the second charging voltage $U_2$ is greater than or equal to the charging limit voltage $U_{c1}$, block S24 is implemented, otherwise block S25 and block S26 are implemented.

In the embodiment, the charging system compares the second charging voltage $U_2$ with the charging limit voltage $U_{c1}$, and charges the battery 13 according to the comparison result.

In block S24, charging the battery at a constant voltage with the second charging voltage to a third charging capacity.

In the embodiment, the charging system 10 uses the second charging voltage $U_2$ to charge the battery 13 at a constant voltage to a third charging capacity. The third charging capacity is the total charging capacity of the battery 13 in blocks S215 and S24.

In detail, the third charging capacity is $Q_3$, and the third charging capacity $Q_3$ is calculated according to formula $Q_3=(1-SOC_2)\times Q$.

When the second charging voltage $U_2$ is greater than or equal to the charging limit voltage $U_{c1}$, the charging system 10 will use the second charging voltage $U_2$ to charge the battery 13 at a constant voltage, and the total charge capacity of the battery at this time is the third charge capacity $Q_3$.

In block S25, charging the battery at a constant current with the charging current $I_m$ to the charging limit voltage $U_c$.

In the embodiment, when the second voltage $U_2$ is less than the charging limit voltage $U_{c1}$, the charging system 10 will charge the battery 13 at a constant current with the charging current $I_m$ until the charging voltage of the battery 13 during the constant current charging phase reaches the charging limit voltage $U_{c1}$.

In block S26, charging the battery at a constant voltage with the charging limit voltage $U_{c1}$, to the fourth charging capacity $Q_4$.

In the embodiment, the fourth charging capacity $Q_4$ is calculated according to formula $Q_4=(1-SOC_2)\times Q$.

In the embodiment, when the charging voltage of the battery 13 during the constant current charging phase reaches the charging limit voltage $U_{c1}$, the charging system 10 will perform constant voltage charging of the battery 13 with the charging limit voltage $U_{c1}$, and constantly charge the battery 13 to the charging limit voltage $U_{c1}$ with the charging current $I_m$, and the total charging capacity at this time (the sum of the charging capacities in blocks S215, S25, and S26) at the constant voltage charging stage under the charging limit voltage $U_{c1}$ is the fourth charging capacity $Q_4$, to ensure that while the charging rate of the battery 13 is at maximum, the battery is not overcharged.

The embodiments of the application of the battery system is made by a series of steps or processes including making $LiCoO_2$ as a cathode, making graphite as an anode, diaphragm, electrolyte and packaging shell, mixing, coating, assembly, chemicalization, and ageing. Part of the battery electronic core is joined by reference electrodes between the cathode and the anode to make a three-electrode battery to test the anode non-polarization curve and the anode impedance during charging of battery. It should be noted that the embodiments of the application may also apply to batteries of other chemical systems. For example, using other substance, such as lithium manganate, lithium iron phosphate, or terayuan materials as the cathode materials of battery. It should be noted that the embodiments of the application take the battery's charging limit voltage to 4.45V as an example. This application of charging methods can be applied to a variety of voltage system of batteries, not limited to the 4.45V voltage system of battery. The 4.45V voltage system of battery is compared for circulation performance by using prior charging method (constant current constant pressure charging) of existing technology, and the embodiments of the charging method applied for in this application is tested for circulation performance, and the charging speed is compared across two charging methods.

The comparative embodiments 1 and 2 described below both illustrate the charging method in the prior art to charge the battery.

Comparative Embodiment 1

The conventional charging method (such as a constant current charging phase ending with a fixed voltage) is used to charge a fresh battery (such battery has been charged and discharged for 1 cycle) is charged. The environment temperature is 25 degrees as an example.

Step 1) performing constant current charging with a constant current of 1.5 C until a voltage of the battery is 4.45V (namely a charging limit voltage of the battery 13);

Step 2) performing constant voltage charging with a constant voltage of 4.45V until a cut-off current of the battery at 0.05 C;

Step 3) standing and resting the battery for 5 minutes;

Step 4) performing constant current discharging with a constant current of 1.5 C until a voltage of the battery is 3V;

Step 5) standing the battery for 5 minutes;

Step 6) repeating the step 1) to step 5) 500 times, that is charging and discharging the battery for 500 cycles.

It should be noted that the embodiments 1-2 use the fresh battery to acquire the appropriate parameters, and charge the fresh battery according to the application of charging method of previous art. The environment temperature of embodiments 1-2 is the same as the comparative embodiment 1. The fresh battery is a battery that has not been used before, or a battery that has less than a preset number (such as 10 times, or other times) of charge and discharge cycles after leaving the factory.

Embodiment 1

(1) an acquisition process of parameter $SOC_0$.

The environment temperature of the battery is 25 degrees as an example.

Selecting the fresh battery to obtain the parameter $SOC_0$, the specific acquisition process is as follows:

Step 1) performing constant current discharging with a constant current of 1.0 C until a voltage of the battery is 3V;

Step 2) standing the battery for 5 minutes;

Step 3) performing constant current charging with a constant current of 1.5 C until a voltage of the battery is 4.45V (namely a charging limit voltage of the battery 13);

Step 4) performing constant voltage charging with a constant voltage of 4.45V until a current of the battery is 0.05 C; and calculating that the SOC at the end of the constant current charging in step 3 is 70.6%, and the $SOC_0$ value is 70.6%.

(2) the charging process:

The environment temperature of the battery is 25 degrees as an example.

Step 1) obtaining the actual capacity Q of the battery.

Step 2) performing constant current charging with a constant current of 1.5 C until a state of charge $SOC_1$ of the battery at the end of the constant current charging phase is 70.6%;

Step 3) obtaining the cut-off voltage $U_2$ (the second charging voltage) of the constant current charging stage in step 2, performing constant voltage charging with a constant voltage of the $U_2$ to the actual capacity Q of the battery.

Step 4) standing the battery for 5 minutes;

Step 5) performing constant current discharging with a constant current of 1.0 C until a voltage of the battery is 3V;

Step 6) obtaining the discharge capacity in step 5 to obtain the actual capacity Q of the battery;

Step 7) repeating the step 2) to step 6) 500 times.

Embodiment 2

(1) an acquisition process of parameter $SOC_0$.

The acquisition process of parameter $SOC_0$ is the same as Embodiment 1 except that in step 4) $SOC_0$ value is 71%.

(2) the charging process:

The charging process is the same as Embodiment 1 except that in step 2) $SOC_0$ value is 71%.

Comparative Embodiment 2

It should be noted Comparative Embodiment 2 discloses a specific implementation process of using a battery that has been cycled 100 times to execute the charging method of the prior art.

The charging process is the same as the Comparative Embodiment 1 except that the recycled battery has been charged and discharged for 100 cycles.

Embodiment 3

It should be noted that the Embodiment 3 discloses the use of fresh battery to obtain corresponding charging parameters.

(1) an acquisition process of parameter $SOC_0$.

The acquisition process of parameter $SOC_0$ is the same as Embodiment 1, the SOC obtained at the end of the constant current charging phase of the battery is 70.6%, and the $SOC_0$ value is 70.6%.

(2) the charging process:

The charging process is the same as Embodiment 1 except that the battery has been cycled 100 times.

Embodiment 4

It should be noted that the Embodiment 4 discloses the use of fresh battery to obtain corresponding charging parameters.

(1) an acquisition process of parameter $SOC_0$.

The acquisition process of parameter $SOC_0$ is the same as Embodiment 1, the SOC obtained at the end of the constant current charging phase of the battery is 70.6%, and the $SOC_0$ value is 70.6%.

(2) the charging process:

The charging process is the same as Embodiment 1 except that the battery has been cycled 100 times.

Embodiment 5

It should be noted that the Embodiment 5 discloses a specific implementation process of using a battery that has been cycled 100 times to execute the charging method.

(1) an acquisition process of parameter $SOC_0$.

The acquisition process of parameter $SOC_0$ is the same as Embodiment 1 except that the battery has been cycled 100 times to obtain the parameter $SOC_0$. The SOC of the battery at the end of constant current charging phase is 68.7%, and the $SOC_0$ value is 68.7%.

(2) the charging process:

The charging process is the same as Embodiment 1 except that the battery has been cycled 100 times, and the $SOC_1$ is 68.7%.

During the charging and discharging process of the above the comparative embodiments 1 and 2, and the embodiments 1-5, obtaining and recording parameters (such as voltage, current, and charging time, etc.) in Table1.

TABLE 1

Test results of the embodiments and comparative embodiments

| | Value of n | Value of m | Constant current stage $V_1$ | Constant current stage $SOC_1$ | Chagring time of constant current stage/min | Chagring time of constant voltage stage/min | Total charging time/min |
|---|---|---|---|---|---|---|---|
| Comparative Embodiment 1 | 1 | 2 | 4.45 V | 70.6% | 27.7 | 53.6 | 81.3 |
| | 1 | 100 | 4.45 V | 68.7% | 26.2 | 57.3 | 83.5 |
| | 1 | 200 | 4.45 V | 66.0% | 24.7 | 60.3 | 85.0 |
| | 1 | 500 | 4.45 V | 62.9% | 22.5 | 64.2 | 86.7 |
| Embodiment1 | 1 | 2 | 4.45 V | 70.6% | 27.7 | 53.6 | 81.3 |
| | 1 | 100 | 4.46 V | 70.6% | 27.1 | 37.2 | 64.3 |
| | 1 | 200 | 4.49 V | 70.6% | 26.5 | 29.9 | 56.4 |
| | 1 | 500 | 4.53 V | 70.6% | 25.1 | 23.7 | 48.8 |
| Embodiment 2 | 1 | 2 | 4.45 V | 71% | 27.8 | 53.1 | 80.9 |
| | 1 | 100 | 4.47 V | 71% | 27.2 | 35.7 | 62.9 |
| | 1 | 200 | 4.50 V | 71% | 26.6 | 28.2 | 54.8 |
| | 1 | 500 | 4.54 V | 71% | 25.2 | 22.1 | 47.3 |
| Comparative Embodiment 2 | 100 | 102 | 4.45 V | 68.7% | 26.2 | 57.3 | 83.5 |
| | 100 | 200 | 4.45 V | 66.0% | 24.7 | 60.3 | 85.0 |
| | 100 | 300 | 4.45 V | 64.5% | 23.2 | 62.4 | 85.6 |
| | 100 | 500 | 4.45 V | 62.9% | 22.5 | 64.2 | 86.7 |
| Embodiment 3 | 100 | 102 | 4.46 V | 70.6% | 27.1 | 37.2 | 64.3 |
| | 100 | 200 | 4.49 V | 70.6% | 26.5 | 29.9 | 56.4 |
| | 100 | 300 | 4.50 V | 70.6% | 26.0 | 27.6 | 53.6 |
| | 100 | 500 | 4.53 V | 70.6% | 25.1 | 23.7 | 48.8 |
| Embodiment 4 | 100 | 102 | 4.47 V | 71% | 27.2 | 35.7 | 62.9 |
| | 100 | 200 | 4.50 V | 71% | 26.6 | 28.2 | 54.8 |
| | 100 | 300 | 4.51 V | 71% | 26.1 | 26.4 | 52.5 |
| | 100 | 500 | 4.54 V | 71% | 25.2 | 22.1 | 47.3 |
| Embodiment 5 | 100 | 102 | 4.45 V | 68.7% | 26.2 | 57.3 | 83.5 |
| | 100 | 200 | 4.46 V | 68.7% | 25.8 | 38.4 | 64.2 |
| | 100 | 300 | 4.48 V | 68.7% | 25.3 | 34.4 | 59.7 |
| | 100 | 500 | 4.51 V | 68.7% | 24.5 | 28.8 | 53.3 |

Table 1 shows, in the charging method in Comparative Embodiments 1 to 2, with the battery recycling for use, the impedance of the battery 13 will gradually increase, so that the charging time of the constant current charging stage is shortened, the charging time of the battery 13 in the constant voltage charging stage is extended, so that the total charging time of the battery 13 is extended. Compared with Comparative Embodiments 1 and 2, the charging method used in Embodiments 1 to 5 extends the charging time in the constant current charging stage and greatly reduces the charging time in the constant voltage charging stage. It can be seen that the charging time of the charging method of Embodiments 1 to 5 is faster than the charging methods of Comparative Embodiments 1 and 2, namely, the full charging time of the Embodiments 1 to 5 is shorter than the battery charging methods of Comparative Embodiments 1 and 2.

Embodiment 1 and Embodiment 2 show that the charging speed of Embodiment 2 is faster than the charging speed of Embodiment 1, that is, the full charging time of the battery can be shortened by increasing the SOC at the end of the constant current charging stage. Embodiment 3 and Embodiment 4 give the same conclusion.

In the charging methods of Comparative Embodiments 1 and 2, as the battery is used, the anode voltage gradually increases, and the charging methods in Embodiments 1 to 5 can reduce the anode voltage, but the anode potential is still greater than that with the fresh batteries, so that the battery does not cause lithium deposition, and can improve the safety and service life of the battery.

In addition, in the charging method in Comparative Embodiments 1 and 2, the cathode voltage is gradually increased during use of the battery, and at the same time, the time of the cathode under a high voltage is extended. Compared with Comparative Embodiments 1 and 2, the cathode voltages in Embodiments 1 to 5 are further increased, the charging time of the constant current charging phase is slightly increased, and the charging time of the constant voltage charging phase is greatly reduced, that is, the full charging time is significantly reduced, the battery voltage and cathode voltage increase, which shortens the charging time of the constant voltage charging phase under the high voltage, and improves the cycle performance of the battery. At the same time, the method in Embodiment 1 obviously increases the cathode potential and decreases the charging time of the constant voltage charging phase. In general, the amount of the charging voltage and the length of the charging time affect the cycle performance of the battery.

The embodiment of the present application uses the standard state of charge to cut off the constant current charging phase of the battery in the mth charge and discharge cycle, which extends the charging time of the constant current charging phase and shortens the charging time of the constant voltage charging phase, and can further shorten the full charging time of the battery, which is shorter than the charging time required by the charging method in the prior art.

Figure 4:
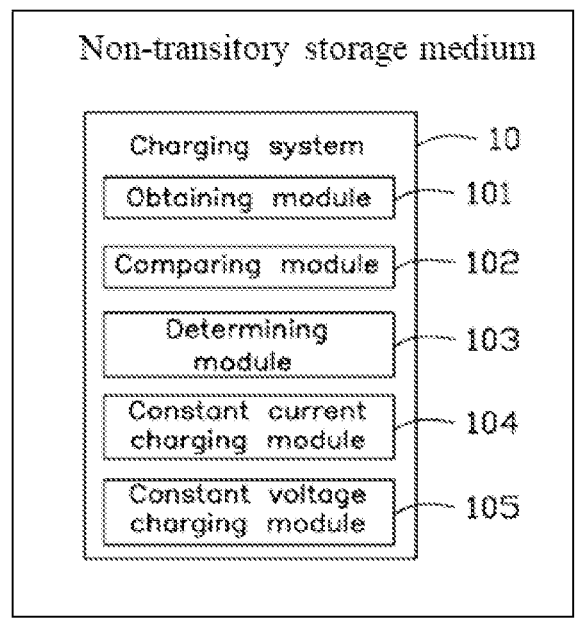
FIG. 4 is a block diagram of one embodiment of a battery-charging system.

Referring to FIG. 4, in at least one embodiment, the charging system 10 may be divided into one or more modules, and the one or more modules are stored in the processor 11 and executed by at least one processor. The one or more modules may be a series of computer program instruction segments capable of performing specific functions, and the instruction segments are for the execution process of the charging system 10 in the electronic device 100. For example, the charging system 10 may be divided into an obtaining module 101, a comparing module 102, and a determining module 103, a constant current charging module 104, and a constant voltage charging module 105, as show in FIG. 4.

In at least one embodiment, the obtaining module 101 obtains a state of charge of the battery at the end of the constant current charging stage at different charging rates corresponding to different temperatures in the nth charge and discharge cycle. The obtaining module 101 is further configured to obtain a state of charge of the battery at the end of the constant current charging stage at the different charging rates corresponding to the different temperatures in the (m−1)th charge and discharge cycle.

In another embodiment, the obtaining module 101 obtains a second state of charge of the battery 13 before a charging process.

In another embodiment, the comparing module 102 compares the standard state of charge and the second state of charge at the same temperature.

In another embodiment, the determining module 103 determines a charging mode of the battery 13 according to a comparison.

In another embodiment, the constant current charging module 104 charges the battery 13 at constant current until the voltage of the battery 13 reaches a cut-off voltage, a charging capacity, or a state of charge. The constant voltage charging module 104 charges the battery 13 at constant voltage until the current of the battery 13 reaches a cut-off current, a charging capacity, or a state of charge.

The charging system 10 provided by the present application not only charges the battery faster, but also can relatively increase the cycle life of the battery. For details, reference may be made to the embodiments of the foregoing battery charging method, and details are not described herein again.

In at least one embodiment, the at least one processor 11 is a central processing unit (CPU), or other general-purpose processor, digital signal processor (DSPs), and application specific integrated circuit (ASIC), Field-Programmable Gate Array (FPGA), or other programmable logic device, discrete gate, or transistor logic device, or discrete hardware component, etc. The processor 11 may be a microprocessor, or the processor 12 may be any conventional processor.

Referring to FIG. 1, when the modules/units integrated in the charging system 10 are implemented in the form of software functional units of independent or standalone products, they may be stored in a non-transitory readable storage medium. Based on this understanding, all or part of the processes in the methods of the above embodiments implemented by the present disclosure may also be completed by related hardware instructed by computer-readable instructions. The computer-readable instructions may be stored in a non-transitory readable storage medium. The computer-readable instructions, when executed by the processor, may implement the steps of the foregoing method embodiments. The computer-readable instructions include computer-readable instruction codes, and the computer-readable instruction codes may be in a source code form, an object code form, an executable file, or some intermediate form. The non-transitory readable storage medium may include any entity or device capable of carrying the computer-readable instruction code, a recording medium, a U disk, a mobile hard disk, a magnetic disk, an optical disk, a computer memory, a read-only memory (ROM).

Understandably, the module division described above is a logical function division, the actual implementation may have other way of division. In addition, each function module in each embodiment of this application may be integrated into the same processing unit, or the individual modules may be physically present, or two or more modules may be integrated in the same cell. The above integrated module may be implemented in the form of hardware, or in the form of hardware plus software function module.

In another embodiment, the electronic device 100 may also include a storage (not shown in the diagram), one or more modules may also be stored in the storage, and executed by the processor 11. The storage may be the internal memory of the electronic device 100, i.e. the storage built into the electronic device 100. In other embodiments, the storage may also be the external memory of the electronic device 100, that is, the storage attached to the electronic device 100.

In some embodiments, the storage is used to store program code and various data, for example, the storage stores the program code of the charging system 10 installed in the electronic device 100, and allow automatic access to the programs and data during the operation of the electronic device 100.

In one embodiment, the storage may include random access memory, as well as non-volatile memory, such as hard drives, memory, plug-in hard drives, smart media card, secure digital, SD card, Flash Card, at least one disk memory, flash device.

It is obvious to a person skilled in the art that the present application is not limited to the details of the above exemplary embodiments, and that the present application can be implemented in other specific forms without departing from the spirit or basic features of the application. Therefore, the above-mentioned embodiments of the present application should be regarded as exemplary and non-limiting from any point of view. The scope of the present application is defined by the appended claims rather than the above description. All changes that come within the meaning and scope of equivalents of the claims are encompassed by this application.

What is claimed is:

1. A method for charging a battery, the method comprising:
    detecting a state of charge of the battery at an end of a constant current charging phase during an nth charge and discharge cycle as $SOC_a$, n is an integer greater than or equal to 0, wherein the battery is charged to a charging limit voltage $U_{c1}$ at the end of the constant current charging phase during the nth charge and discharge cycle;
    detecting a state of charge of the battery at an end of a constant current charging phase during an (m−1)th charge and discharge cycle as $SOC_b$, m is an integer greater than n+1 wherein the battery is charged to the charging limit voltage $U_{c1}$ at the end of the constant current charging phase during the (m−1)th charge and discharge cycle;
    based on the $SOC_a$ and $SOC_b$, determining a standard state of charge $SOC_0$ satisfying the following relationship:

$SOC_b < SOC_0 < SOC_a + k$, $0 \leq k \leq 10\%$, and $SOC_a + k \leq 100\%$;

charging the battery with a charging current at a constant current during an mth charge and discharge cycle, and defining a state of charge of the battery at an end of a constant current charging phase during the mth charge and discharge cycle as a first state of charge $SOC_1$, wherein the first state of charge $SOC_1$ of the battery at an end of the constant current charging phase during the mth charge and discharge cycle is the same as the standard state of charge $SOC_0$.

2. The method according to claim 1, wherein the $SOC_a$ is the state of charge of another battery that is the same as the battery, when the constant current charging phase ends during the nth charge and discharge cycle; and the $SOC_b$ is the state of charge of another battery that is the same as the battery, when the constant current charging phase ends during the (m−1)th charge and discharge cycle.

3. The method according to claim 1, wherein the $SOC_a$ is the state of charge when another battery identical to the battery is charged to the charging limit voltage $U_{c1}$ with a constant current during the nth charge and discharge cycle; and the $SOC_b$ is the state of charge when another battery identical to the battery is charged to the charging limit voltage $U_{c1}$ with a constant current during the (m−1)th charge and discharge cycle.

4. The method according to claim 1, further comprising:
    defining the state of charge of the battery, before charging the battery with the charging current at the constant current during the mth charge and discharge cycle, as a second state of charge $SOC_2$ during the mth charge and discharge cycle; and
    determining whether the second state of charge $SOC_2$ is less than the standard stage of charge $SOC_0$;
    wherein the second state of charge $SOC_2$ is:
    (i) greater than the standard state of charge $SOC_0$, the battery is charged at a constant voltage with a first charging voltage $U_1$, the first charging voltage $U_1$ is a charging voltage of the battery during a constant voltage charging stage before the mth charge and discharge cycle, or the first charging voltage $U_1$ is a preset voltage; and a total charging capacity of the battery is a first charging capacity, the first charging capacity is denoted as $Q_1$, and the first charging capacity $Q_1$ is calculated according to a formula $Q_1 = (1 - SOC_2) \times Q$, the $SOC_2$ is the second state of charge, and the Q is a current actual capacity of the battery; or
    (ii) less than the standard state of charge $SOC_0$, the battery is charged at a constant current with a first charging current $I_m$ to the standard state of charge $SOC_0$; and a charging capacity of the battery is a second charging capacity $Q_2$, and the second charging capacity $Q_2$ is calculated according to a formula $Q_2 = (SOC_1 - SOC_2) \times Q$, and the Q is a current actual capacity of the battery.

5. The method according to claim 1, further comprising:
    defining the state of charge of the battery, before charging the battery with the charging current at the constant current during the mth charge and discharge cycle, as a second state of charge $SOC_2$ during the mth charge and discharge cycle;
    wherein the second state of charge $SOC_2$ is less than the standard state of charge $SOC_0$, the battery is constant current charged with a first charging current $I_m$ to the standard state of charge $SOC_0$; and
    a charging capacity of the battery is a second charging capacity $Q_2$, and the second charging capacity $Q_2$ is calculated according to a formula $Q_2 = (SOC_1 - SOC_2) \times Q$, and the Q is a current actual capacity of the battery.

6. The method according to claim 5, wherein
    the method further comprising:
    obtaining a second charging voltage $U_2$ when the battery is charged to the standard state of charge $SOC_0$ during the mth charge and discharge cycle;
    obtaining the charging limit voltage $U_{c1}$ of the battery;
    comparing the second charging voltage $U_2$ and the charging limit voltage $U_{c1}$; and charging the battery according to a comparison result after charging the battery to the standard state of charge $SOC_0$ during the mth charge and discharge cycle.

7. The method according to claim 6, wherein the charging the battery according to the comparison result after charging the battery to the standard state of charge $SOC_0$ during the mth charge and discharge cycle comprises:
charging the battery at a constant voltage with the second charging voltage $U_2$ to a third charging capacity $Q_3$ when the second charging voltage $U_2$ is greater than or equal to the charging limit voltage $U_{c1}$;
wherein the third charging capacity $Q_3$ is calculated according to a formula $Q_3=(1-SOC_2)\times Q$.

8. The method according to claim 7, wherein the charging the battery according to the comparison result after charging the battery to the standard state of charge $SOC_0$ during the mth charge and discharge cycle comprises:
charging the battery at a constant current with the charging current $I_m$ to the charging limit voltage $U_{c1}$ when the second charging voltage $U_2$ is less than the charging limit voltage $U_{c1}$;
charging the battery at a constant voltage with the charging limit voltage $U_{c1}$ to a fourth charging capacity $Q_4$;
wherein the fourth charging capacity $Q_4$ is calculated according to a formula $Q_4=(1-SOC_2)\times Q$.

9. An electronic device comprising:
a battery; and
at least one processor configured to:
detect a state of charge of the battery at an end of a constant current charging phase during an nth charge and discharge cycle as $SOC_a$, n is an integer greater than or equal to 0; wherein the battery is charged to a charging limit voltage $U_{c1}$ at the end of the constant current charging phase during the nth charge and discharge cycle;
detect a state of charge of the battery at an end of a constant current charging phase during an (m−1)th charge and discharge cycle as $SOC_b$, m is an integer greater than n+1, wherein the battery is charged to the charging limit voltage $U_{c1}$ at the end of the constant current charging phase during the (m−1)th charge and discharge cycle;
based on the $SOC_a$ and $SOC_b$, determine a standard state of charge $SOC_0$ satisfying the following relationship:

$SOC_b<SOC_0<SOC_a+k$, $0≤k≤10\%$, and $SOC_a+k≤100\%$; and charge the battery with a charging current at a constant current during an mth charge and discharge cycle;
wherein a first state of charge $SOC_1$ of the battery at an end of a constant current charging phase in the mth charge and discharge cycle is the same as the standard state of charge $SOC_0$.

10. The electronic device according to claim 9, wherein the $SOC_a$ is the state of charge of another battery that is the same as the battery, when the constant current charging phase ends during the nth charge and discharge cycle; and the $SOC_b$ is the state of charge of another battery that is the same as the battery, when the ending of the constant current charging phase during the (m−1)th charge and discharge cycle.

11. The electronic device according to claim 9, wherein the $SOC_a$ is the state of charge when another battery identical to the battery is charged to the charging limit voltage $U_{c1}$ with a constant current during the nth charge and discharge cycle; and the $SOC_b$ is the state of charge when another battery identical to the battery is charged to the charging limit voltage $U_{c1}$ with a constant current during the (m−1)th charge and discharge cycle.

12. The electronic device according to claim 9, wherein the at least one processor is further configured to execute:
defining the state of charge of the battery, before charging the battery with the charging current at the constant current during the mth charge and discharge cycle, as a second state of charge $SOC_2$ during the mth charge and discharge cycle; and
determining whether the second state of charge $SOC_2$ is less than the standard stage of charge $SOC_0$;
wherein the state of charge $SOC_2$ is:
(i) greater than the standard state of charge $SOC_0$, the battery is charged at a constant voltage with a first charging voltage $U_1$, the first charging voltage $U_1$ is a charging voltage of the battery during a constant-voltage charging stage before the mth charge and discharge cycle, or the first charging voltage $U_1$ is a preset voltage; and a total charging capacity of the battery is a first charging capacity, the first charging capacity is denoted as $Q_1$, and the first charging capacity $Q_1$ is calculated according to a formula $Q_1=(1-SOC_2)\times Q$, the $SOC_2$ is the second state of charge, and the Q is a current actual capacity of the battery; or
(ii) less than the standard state of charge $SOC_0$, the battery is charged at a constant current with a first charging current $I_m$ to the standard state of charge $SOC_0$, and a charging capacity of the battery is a second charging capacity $Q_2$, and the second charging capacity $Q_2$ is calculated according to a formula $Q_2=(SOC_1-SOC_2)\times Q$, and the Q is a current actual capacity of the battery.

13. The electronic device according to claim 9, wherein the at least one processor is further configured to execute:
defining the state of charge of the battery, before charging the battery with the charging current at the constant current during the mth charge and discharge cycle, as a second state of charge $SOC_2$ during the mth charge and discharge cycle;
wherein the second state of charge $SOC_2$ is less than the standard state of charge $SOC_0$, the battery is charged at a constant current with a first charging current $I_m$ to the standard state of charge $SOC_0$; and
a charging capacity of the battery is a second charging capacity $Q_2$, and the second charging capacity $Q_2$ is calculated according to the formula $Q_2=(SOC_1-SOC_2)\times Q$, and the Q is a current actual capacity of the battery.

14. The electronic device according to claim 13, wherein the at least one processor is further configured to:
obtain a second charging voltage $U_2$ when the battery is charged to the standard state of charge $SOC_0$ during the mth charge and discharge cycle;
obtain the charging limit voltage $U_{c1}$ of the battery;
compare the second charging voltage $U_2$ and the charging limit voltage $U_{c1}$; and
charge the battery according to a comparison result after charging the battery to the standard state of charge $SOC_0$ during the mth charge and discharge cycle.

15. The electronic device according to claim 14, wherein the at least one processor is further configured to charge the battery according to the comparison result after charging the battery to the standard state of charge $SOC_0$ during the mth charge and discharge cycle comprising:
charge the battery at a constant voltage with the second charging voltage $U_2$ to a third charging capacity $Q_3$ when the second charging voltage $U_2$ is greater than or equal to the charging limit voltage $U_{c1}$;

wherein the third charging capacity $Q_3$ is calculated according to a formula $Q_3=(1-SOC_2) \times Q$.

16. The electronic device according to claim 14, wherein the at least one processor is further configured to charge the battery according to the comparison result after charging the battery to the standard state of charge $SOC_0$ during the mth charge and discharge cycle comprising:
  charge the battery at a constant current with the charging current $I_m$ to the charging limit voltage $U_{c1}$ when the second charging voltage $U_2$ is less than the charging limit voltage $U_{c1}$;
  charge the battery at a constant voltage with the charging limit voltage $U_{c1}$ to a fourth charging capacity $Q_4$;
  wherein the fourth charging capacity $Q_4$ is calculated according to a formula $Q_4=(1-SOC_2) \times Q$.

17. A non-transitory storage medium having stored thereon instructions that, when executed by a processor of an electronic device, causes the processor to perform a method for charging a battery, the electronic device comprising the battery, the method comprising:
  detecting a state of charge of the battery at an end of a constant current charging phase during an nth charge and discharge cycle as $SOC_a$, n is an integer greater than or equal to 0, wherein the battery is charged to a charging limit voltage $U_{c1}$ at the end of the constant current charging phase during the nth charge and discharge cycle;
  detecting a state of charge of the battery at an end of a constant current charging phase during an (m−1)th charge and discharge cycle as $SOC_b$, m is an integer greater than n+1, wherein the battery is charged to the charging limit voltage $U_{c1}$ at the end of the constant current charging phase during the (m−1)th charge and discharge cycle;
  based on the $SOC_a$ and $SOC_b$, determining a standard state of charge $SOC_0$ satisfying the following relationship:

$SOC_b < SOC_0 < SOC_a + k$, $0 \leq k \leq 10\%$, and $SOC_a + k \leq 100\%$; and charging the battery with a charging current at a constant current during an mth charge and discharge cycle;
  wherein a first state of charge $SOC_1$ of the battery at an end of a constant current charging phase during the mth charge and discharge cycle is the same as the standard state of charge $SOC_0$.

18. The non-transitory storage medium according to claim 17, wherein the $SOC_a$ is the state of charge of another battery that is the same as the battery, when the ending of the constant current charging phase during the nth charge and discharge cycle; and the $SOC_b$ is the state of charge of another battery that is the same as the battery, when the ending of the constant current charging phase during the (m−1)th charge and discharge cycle.

19. The non-transitory storage medium according to claim 17, wherein the $SOC_a$ is the state of charge when another battery identical to the battery is charged to the charging limit voltage $U_{c1}$ with a constant current during the nth charge and discharge cycle; and the $SOC_b$ is the state of charge when another battery identical to the battery is charged to the charging limit voltage $U_{c1}$ with a constant current during the (m−1)th charge and discharge cycle.

20. The non-transitory storage medium according to claim 17, further comprising:
  defining the state of charge of the battery, before charging the battery with the charging current at the constant current during the mth charge and discharge cycle, as a second state of charge $SOC_2$ during the mth charge and discharge cycle; and
  determining whether the second state of charge $SOC_2$ is less than the standard stage of charge $SOC_0$;
  when the second state of charge $SOC_2$ is greater than the standard state of charge $SOC_0$, the battery is charged at a constant voltage with a first charging voltage $U_1$, the first charging voltage $U_1$ is a charging voltage of the battery during a constant-voltage charging stage before the mth charge and discharge cycle, or the first charging voltage $U_1$ is a preset voltage; and
  wherein a total charging capacity of the battery is a first charging capacity, the first charging capacity is denoted as $Q_1$, and the first charging capacity $Q_1$ is calculated according to a formula $Q_1=(1-SOC_2) \times Q$, the $SOC_2$ is the second state of charge, and the Q is a current actual capacity of the battery.

* * * * *